US006817259B2

(12) United States Patent
Asbrand et al.

(10) Patent No.: US 6,817,259 B2
(45) Date of Patent: Nov. 16, 2004

(54) STEERING GEAR FOR MOTOR VEHICLES

(75) Inventors: Ulrich Asbrand, Altdorf (DE); Jürgen Class, Illingen (DE)

(73) Assignee: DaimlerChrysler AG, Stuttgart (DE)

( * ) Notice: Subject to any disclaimer, the term of this patent is extended or adjusted under 35 U.S.C. 154(b) by 120 days.

(21) Appl. No.: 10/323,581

(22) Filed: Dec. 18, 2002

(65) Prior Publication Data

US 2003/0115979 A1 Jun. 26, 2003

(30) Foreign Application Priority Data

Dec. 19, 2001 (DE) .......................................... 101 62 470

(51) Int. Cl.[7] .............................................. B62D 3/12
(52) U.S. Cl. ...................................... 74/89.17; 74/409
(58) Field of Search ........................ 74/89.17, 388 PS, 74/409, 422, 440

(56) References Cited

U.S. PATENT DOCUMENTS 3,585,875 A   6/1971   Adams

FOREIGN PATENT DOCUMENTS

| DE | 24 37 457 | * | 2/1976 |
| EP | 1 084 933 | | 3/2001 |
| GB | 2 037 931 | | 7/1980 |
| WO | WO 83/04079 | * | 11/1983 |

* cited by examiner

Primary Examiner—William C. Joyce
(74) Attorney, Agent, or Firm—Klaus J. Bach

(57) ABSTRACT

In a rack-and-pinion steering gear for motor vehicles, in which in a steering gear housing a pressure piece is guided within a stub having an axis normal to that of the steering-gear housing so that the pressure piece is longitudinally displaceable in the guide stub. A preloading force acts on the pressure piece at an angle to the direction of motion of the pressure piece such that the pressure piece is held in engagement with a side wall of the stub in either direction of movement of the rack.

6 Claims, 1 Drawing Sheet

STEERING GEAR FOR MOTOR VEHICLES

BACKGROUND OF THE INVENTION

The invention relates to a steering gear for motor vehicles with a steering rack disposed in a steering gear housing and a steering shaft with a pinion mounted on the shaft and disposed in the housing in meshing engagement with the steering rack.

To change the direction in which a vehicle is travelling, the driver indicates a desire to change direction. The predominant means of effecting this change is a steering wheel, which is mounted on a steering shaft. The steering shaft in turn is connected to the steering gear, which is connected via a steering linkage to the wheel carrier of one or more vehicle wheels. Vibrations transmitted into the steering linkage via the vehicle wheels thus reach the steering gear.

In rack and pinion type steering gears, the vibrations are transmitted to the rack, which is mounted in the steering gear housing. To ensure continuous contact between the rack and the drive pinion of the steering shaft, however, one known practice is to press the rack against the drive pinion in order to prevent disengagement of the rack from the pinion due to vibrations.

For this pressing action a pressure piece is used, which is guided in an opening formed by a stub of the steering-gear housing and, being preloaded by means of a spring, pushes the rack in the direction of the drive pinion. To prevent the pressure piece from jamming in the opening of the guide stub, the guide stub is overdimensioned to a certain extent relative to the outside dimension of the pressure piece.

The frictional force prevailing between the rack and the pressure piece has the effect that, as the rack is displaced, the pressure piece is also displaced radially somewhat in the direction of motion of the rack, namely until the pressure piece comes to rest against the guide stub wall.

These contact processes are repeated with each change in direction of the rack and are perceptible as rattling noises by the driver of the vehicle. The alternating contact processes likewise have a negative effect on the response of the steering and on the vibration behavior of the rack.

EP 1 084 933 A1 discloses an arrangement for avoiding this problem by sloping the opening that accommodates the pressure piece at an angle α relative to a line perpendicular to the longitudinal axis of the rack. This is intended to ensure that a radial force is exerted by the pressure piece on the opening accommodating the pressure piece in order to prevent the pressure piece from lifting off from the guide stub wall.

To provide such an angle between a line perpendicular to the longitudinal axis of the rack and the opening accommodating the pressure piece however is disadvantageous for the manufacture of a rack-and-pinion steering gear since, while the housing wall thickness of the connecting stub is constant, it results in an undercut which can present difficulties in the production of the housing by casting for example.

It is therefore the object of the present invention to provide a steering gear for motor vehicles, in which rattling noises due to alternating contact of the pressure piece do not occur and which has a housing that can be manufactured by simple means.

SUMMARY OF THE INVENTION

In a rack-and-pinion steering gear for motor vehicles, in which in a steering gear housing a pressure piece is guided within a stub having an axis normal to that of the steering-gear housing so that the pressure piece is longitudinally displaceable in the guide stub. A preloading force acts on the pressure piece at an angle to the direction of motion of the pressure piece such that the pressure piece is held in engagement with a side wall of the stub in either direction of movement of the rack.

This provides for to a radial force which presses the pressure piece against a wall of the guide opening. The angle is chosen so that the radial force effective on the guide wall by the pressure piece is greater than the static friction prevailing between the rack and the pressure piece in order to prevent the pressure piece from lifting off from the guide wall.

In a preferred embodiment of the invention, the stub of the steering-gear housing extends virtually at a right angle to the longitudinal axis of the rack. This ensures an arrangement of the stub on the steering-gear housing that facilitates the manufacture since the stub can be manufactured in a way that is advantageous for a casting process, for example, i.e. without undercuts and with approximately constant wall thickness.

The preloading force acting on the pressure piece is preferably provided by a spring, e.g. a helical spring. The preloading force can also be generated hydraulically or pneumatically by means of a hydraulic or pneumatic ram. In this arrangement, the spring is supported on a cover, which is screwed into the stub and thus closes the opening of the stub.

It is possible to support the spring in a recess of the pressure piece, having a bottom wall extending virtually at right angle to the longitudinal axis of the spring. This allows reliable support of the spring in the pressure piece. Radial guidance of the spring can be provided by the shaping of the recess in the pressure piece including the bottom wall. It is also possible to form the bottom in the recess of the pressure piece at right angles to the longitudinal axis of the pressure piece and to mount an additional wedge-shaped support element on the bottom to provide the inclined support surface for the spring. Without this additional supporting element, some deformations in the end regions of the spring may be necessary to ensure reliable contact between the ends of the spring and the support surfaces.

A support element of this kind is provided in a further embodiment to provide support in the cover closing off the stub. This support element has a base surface whose geometrical shape allows a relative motion between the support element and the cover. This relative motion occurs when the cover is screwed into the stub and presses the support element against the spring in the process. To prevent the spring from being twisted, the base surface of the support element must be formed in such a way that it can rotate relative to the cover.

Moreover, the support element has a support surface for the spring. This second surface slopes relative to the base surface in such a way that, as support surface, it extends virtually at a right angle to the longitudinal axis of the spring.

In a further refinement of the invention, the support element is configured in such a way that it extends at least partially into the turns of the spring and thus assists in the radial guidance of the spring. This guidance and the configuration of the inner wall of the recess in the pressure piece are an effective means of preventing tilting or jamming of the spring during inward or outward spring deflection.

For purposes of adjustment and checking, in still a further refinement of the invention, the support element has a passage which is coaxial with the longitudinal axis of the cover. During operation, a plug, e.g. a rubber plug, closes the opening of the cover and, when assembly or adjustment is being carried out, it allows easy access for a tool to the bottom of the recess in the pressure piece.

The invention will be described in greater detail below with reference to the various embodiments illustrated in the accompanying drawing.

BRIEF DESCRIPTION OF THE DRAWING

The sole FIGURE.

Figure 1:
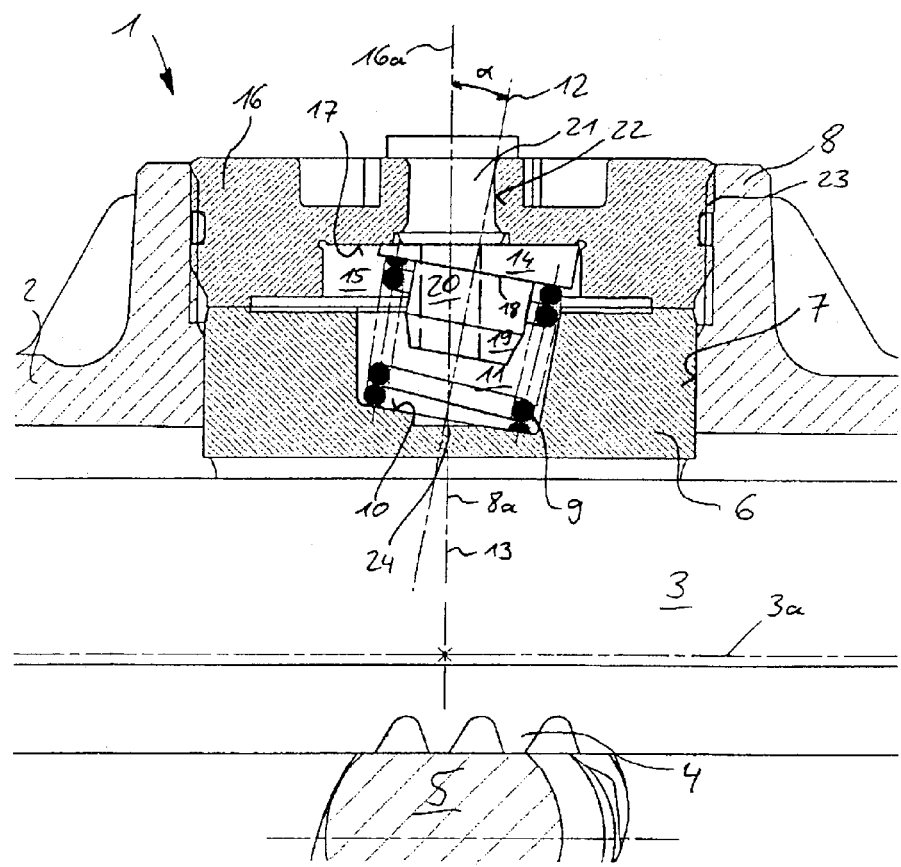
FIG. 1, shows schematically a detail of a longitudinal section through a steering gear 1 according to the invention.

In the arrangement, as shown in FIG. 1 the steering-gear housing 2 surrounds a rack 3, which is mounted in such a way that it can be displaced in the direction of the longitudinal axis 3a. On one longitudinal side, the rack 3 has teeth 4 for engagement with the steering spindle 5.

Arranged at the side of the rack 3 opposite the spindle 5 is a pressure piece 6, which is mounted in such a way as to be longitudinally displaceable in an opening 7 of a stub 8 of the steering housing 2. In this arrangement, the pressure piece 6 is pressed against the rack 3 by a preloaded spring 9.

One end of the spring 9 is supported on the bottom 10 of a recess 11 in the pressure piece 6. In this arrangement, the longitudinal axis 12 of the spring 9 slopes at an angle α greater than zero relative to the longitudinal axis 13 of the pressure piece 6. The other end of the spring 9 is supported against a support element 14, which is mounted in a circular recess 15 in a cover 16. The support element 14 has a basic wedge-shape with a round base surface, with the result that the support element 14 on one hand rests flat against the bottom 17 of the cover 16 and, on the other hand, forms an abutment for the spring 9 by means of a support surface 18 which extends at least partially virtually at a right angle to the longitudinal axis 12 of the spring.

Extending a right angle to the support surface 18, the support element 14 has a stud 19, which projects at least partially into the turns of the spring 9 and thus assists in the radial guidance of the spring 9. A hole 20 extends through the support element 14 coaxially with the longitudinal axis 13 of the pressure piece 6. This hole is closed at one end by a plug 21 in an opening 22 of the cover 16.

The cover 16 is screwed axially into the stub by means of an internal thread 23 in the stub 8. The preloading of the spring 9 between the cover 16 and the pressure piece 6 is determined by the depth to which the cover 16 is screwed in. The axial position of the pressure piece 6 in the stub 8 can be checked via the opening 22 in the cover 16 and the hole 20 in the support element 14. For this purpose, the bottom 10 of the recess 11 in the pressure piece 6 has a measuring mark 24.

What is claimed is:

1. A steering gear for motor vehicles comprising:
    a steering-gear housing (2),
    a rack (3) supported in said housing (2) so as to be longitudinally displaceable therein,
    a drive pinion (5) connected to a steering shaft and being in engagement with said rack (3),
    said housing including a stub (8) defining a cylindrical opening (7) arranged opposite said drive pinion (3) and having an axis extending normal to said rack (3),
    a pressure piece (6) supported within said cylindrical opening (7) of the steering-gear housing (2) in such a way as to be longitudinally displaceable therein for engaging said rack (3) and transmitting to the rack (3) a preloading force which acts on said pressure piece (6), said preloading force acting on the pressure piece (6) being generated by a spring (9) which is supported, on the one hand, against the pressure piece (6) and, on the other hand, by a cover (16) which closes the stub (8) of the steering-gear housing (2),
    said preloading force having a direction so as to act on the pressure piece at an angle α with respect to the direction of motion of the pressure piece.

2. A steering gear according to claim 1, wherein the pressure piece (6) includes a recess (11) in which the spring (9) is supported, said recess (11) having a bottom wall (10) extending at a right angle with respect to the longitudinal axis (12) of the spring (9).

3. A steering gear according to claim 1, wherein the cover (16) includes a support element (14), which has a support surface (18) for the spring (9) which extends essentially at a right angle to the longitudinal axis (12) of the spring (9).

4. A steering gear according to claim 3, wherein said support element (14) extends partially into the turns of the spring (9).

5. A steering gear according to claim 4, wherein said support element (14) has a passage (20) which is coaxial with the longitudinal axis (16a) of the cover (16).

6. A steering gear according to claim 1, wherein the enclosed angle α between the direction of action (12) of the preloading force acting on the pressure piece (6) and the direction of motion (13) of the pressure piece (6) is chosen in such a way that the radial force which the pressure piece (6) exerts on the guide (7) in the stub (8) is greater than the static friction acting between the pressure piece (6) and the rack (3).

* * * * *